(12) United States Patent
Reed et al.

(10) Patent No.: US 7,493,999 B2
(45) Date of Patent: *Feb. 24, 2009

(54) HYBRID ELECTRO-MECHANICAL TRANSMISSION PARK SYSTEM AND METHOD OF ASSEMBLY

(75) Inventors: William S. Reed, Greenfield, IN (US); James A. Raszkowski, Indianapolis, IN (US); Joel E. Mowatt, Zionsville, IN (US); Bert D. Love, Brownsburg, IN (US); Rick K. Daugherty, Clayton, IN (US)

(73) Assignee: General Motors Corporation, Detroit, MI (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/040,666

(22) Filed: Jan. 21, 2005

(65) Prior Publication Data

US 2005/0205383 A1   Sep. 22, 2005

Related U.S. Application Data

(60) Provisional application No. 60/555,141, filed on Mar. 22, 2004.

(51) Int. Cl.
*F16H 57/10* (2006.01)
*F16H 57/02* (2006.01)

(52) U.S. Cl. .............. 192/219.5; 74/411.5; 74/606 R; 29/469

(58) Field of Classification Search ............. 192/219.5
See application file for complete search history.

(56) References Cited

U.S. PATENT DOCUMENTS

| 2,875,856 | A | * | 3/1959 | Mrlik et al. ............... 188/69 |
| 3,373,850 | A | * | 3/1968 | Helmer ................. 192/219.5 |
| 3,601,230 | A | * | 8/1971 | Platz ........................ 188/31 |
| 3,645,147 | A | * | 2/1972 | Fodrea .................... 74/375 |
| 3,729,075 | A | * | 4/1973 | Piret .................. 192/219.5 |
| 4,606,242 | A | * | 8/1986 | Hasegawa et al. ....... 74/606 R |
| 5,630,339 | A |   | 5/1997 | Tuday .................... 74/577 |
| 5,685,406 | A |   | 11/1997 | Crum et al. ................ 192/4 |
| 5,935,035 | A | * | 8/1999 | Schmidt ..................... 475/5 |
| 5,943,918 | A | * | 8/1999 | Reed, Jr. et al. ........... 74/661 |
| 2005/0205384 | A1 | * | 9/2005 | Reed et al. ............ 192/219.5 |
| 2005/0205385 | A1 | * | 9/2005 | Reed et al. ............ 192/219.5 |

FOREIGN PATENT DOCUMENTS

JP           03200458 A   *   9/1991

* cited by examiner

Primary Examiner—Richard M. Lorence

(57) ABSTRACT

This invention relates to the housing of a hybrid electro-mechanical transmission consisting of park pawl system located in the end cover portion of the transmission housing. The end cover portion is configured to cover the park pawl system and allow access to the components of the park pawl system for assembly or service even as the end cover portion remains attached to the main housing of the transmission. Beyond providing coverage to the park pawl system, the end cover portion also provides structural support to a main housing portion during operation of the transmission. A method of assembling a park pawl system between main and end cover portions of a transmission housing is also provided.

15 Claims, 2 Drawing Sheets

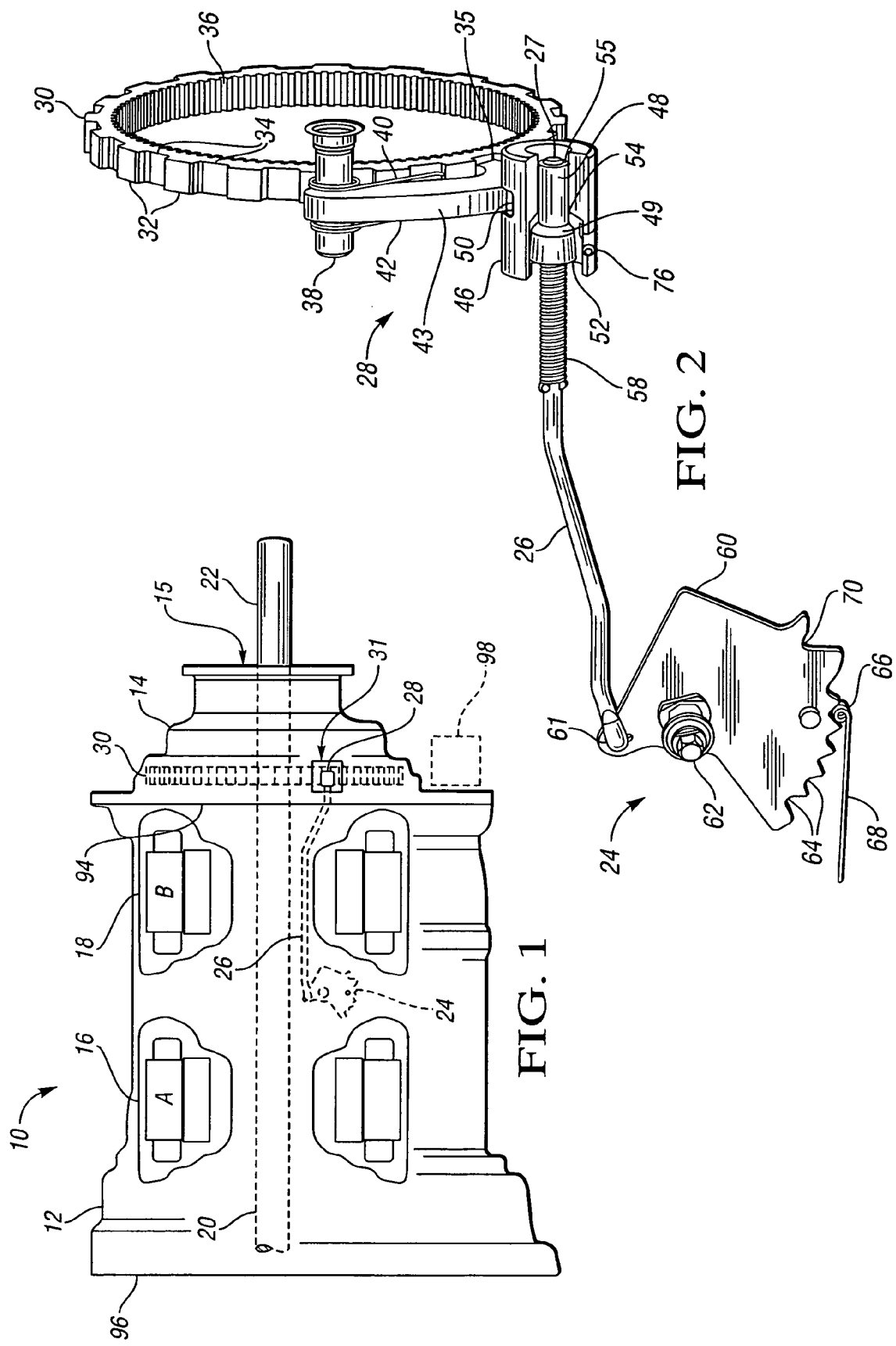

HYBRID ELECTRO-MECHANICAL TRANSMISSION PARK SYSTEM AND METHOD OF ASSEMBLY

CROSS-REFERENCE TO RELATED APPLICATIONS

This application claims the benefit of U.S. Provisional Application 60/555,141 filed Mar. 22, 2004.

TECHNICAL FIELD

This invention relates to a hybrid electro-mechanical transmission having a park pawl system, which is at least partially located and assembled in an end cover portion of a transmission housing.

BACKGROUND OF THE INVENTION

Vehicle transmissions, specifically planetary gear automatic power transmissions, typically have a park brake mechanism to resist the vehicle's natural tendency to roll down a sloped surface when the vehicle is in park. The contents of such a park brake generally include some sort of gear that is fixed with respect to the output shaft of the transmission and a pawl designed to selectively engage with the gear when the park brake is activated. The pawl substantially prevents the output shaft and attached gear from rotating when the pawl engages with the recesses between the gear teeth. One example of a successful park pawl arrangement is described in commonly assigned U.S. Pat. No. 5,630,339 entitled "Park Mechanism for Vehicle Transmission," Tuday, T May 20, 1997, and hereby incorporated by reference in its entirety.

Vehicles with complex non-traditional powertrains, like electro-mechanical vehicles, still require a park brake mechanism. However, the alteration of some components of the transmission may require the park pawl and its complementary components to be altered as well. For example, some hybrid electro-mechanical transmissions require the use of two electric motors to supply power to the output shaft of the transmission. The two motors significantly increase the amount of packaging space needed for the transmission. Therefore, the surrounding transmission components, including the park brake mechanism, must be adjusted to accommodate the additional power supply. The location and placement of these surrounding components, however, is limited by the dimensions of neighboring vehicle components and by any clearance requirements for the underbody of the vehicle. The park pawl for the aforementioned transmission was placed farther rearward to accommodate the second electric motor. A cover or housing was required to protect the park brake from contamination. Major design considerations of the rear cover include manufacturability, structural integrity, weight, and material costs requirements.

SUMMARY OF THE INVENTION

In light of the design challenges mentioned, the present invention provides a transmission housing with a park pawl system located in an end cover portion of the transmission housing. The end cover portion blankets the park pawl system while also defining a cavity that is large enough to provide access to the park pawl system through the exterior of the end cover portion.

In one aspect of the present invention, the end cover portion is detachable from the main housing of the transmission. However, the park pawl system remains accessible without detaching the end cover portion from the main housing.

In another aspect of the present invention, a shift selector located in the main housing of the transmission is mechanically linked to the park pawl system in the end cover portion of the transmission. The end cover portion has an aperture through which a connecting rod extends between the shift selector and park pawl system.

In another aspect of the present invention, an aperture is included in the end cover portion to allow for the installation of a pawl pin onto the pawl without detaching the end cover portion from the main housing of the transmission.

In an additional aspect of the present invention, the end cover portion is designed to be sufficiently strong enough to provide structural support to the main housing of the transmission during operation.

More specifically, the present invention relates to a transmission including a transmission housing, with a main housing which defines a portion of the transmission housing and a park pawl system which is at least partially located in an end cover portion of the transmission housing.

Another aspect of this invention is a method of assembling a hybrid electro-mechanical vehicular transmission having an electric motor module and a park pawl engagement system. The method includes providing a transmission main housing with a terminal portion sufficiently open-ended to receive and house the electric motor module and a first portion of the park pawl engagement system; providing a transmission end cover sufficiently expansive for covering the open-end of the terminal portion and sufficiently configured to house a second portion of the park pawl engagement system; assembling the first portion of the park pawl engagement system in the transmission main housing; assembling the second portion of the park pawl engagement system in the transmission end cover; and mechanically interconnecting the first and second portions of the park pawl engagement system during the covering of the open-end of the terminal portion by the transmission end cover.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a side elevational view of an electro-mechanical transmission housing with end cover portion and with parts broken away to show the electrical motors in their respective housings;

FIG. 2 is a perspective view of the engagement gear, park pawl system, connecting rod, and shift selector isolated from the main transmission housing and end cover portion.

DESCRIPTION OF THE PREFERRED EMBODIMENTS

Figure 3:
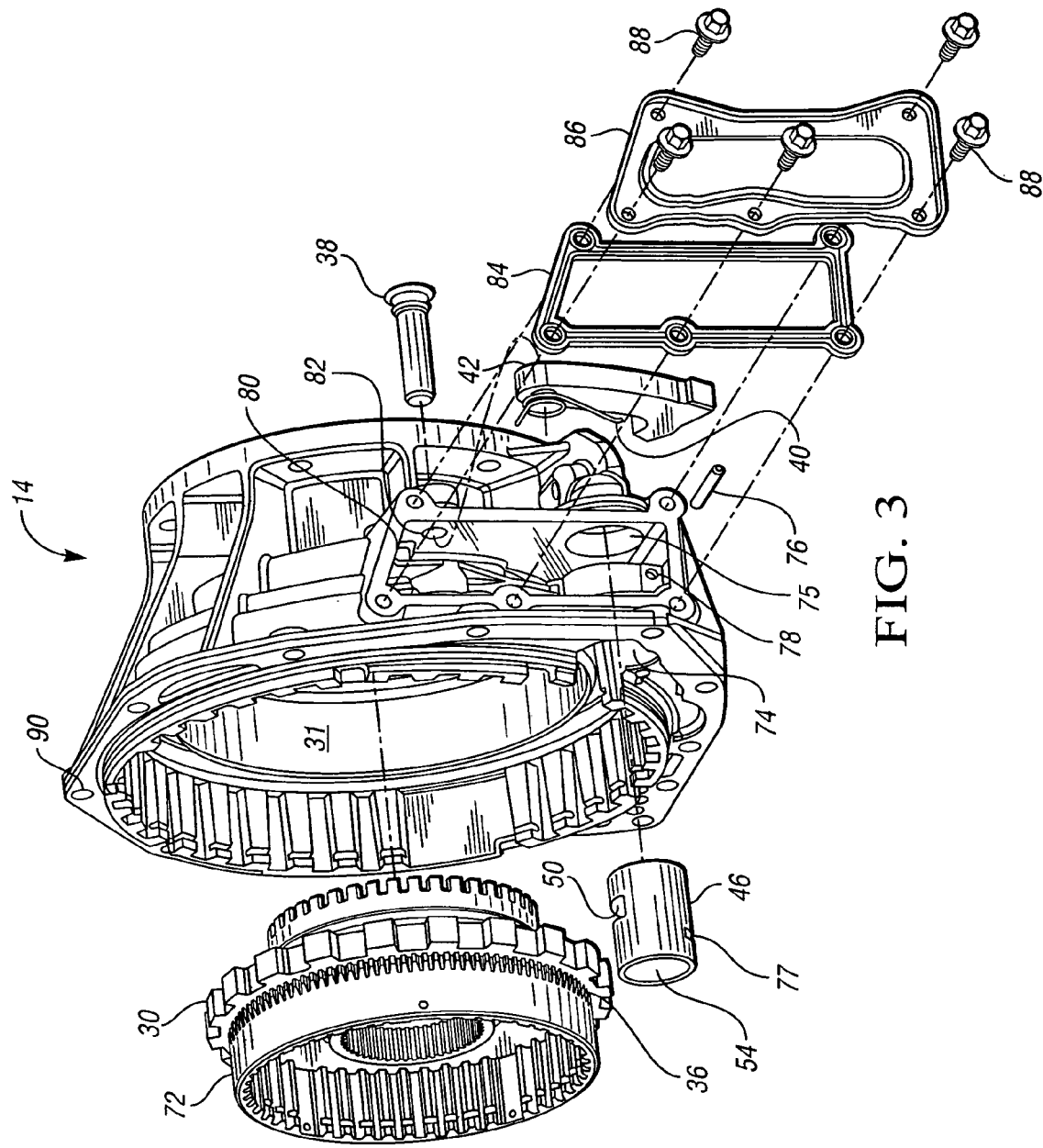
FIG. 3 is an exploded perspective view of the end cover portion, engagement gear, park pawl system, and access cover.

Referring to the drawings, FIGS. 1 through 3, wherein like characters represent the same or corresponding parts throughout the several views, there is shown in FIG. 1 a schematic side elevational view of a hybrid electro-mechanical transmission 10. The transmission consists of a two-part housing: the main housing 12 and the end cover portion 14. The main housing 12 contains two electric motors (A and B), which have their respective housings (or modules) 16 and 18. Motors A and B are journaled onto the main shaft 20 of the transmission, which is selectively linked to the output shaft 22 of the transmission. The motors (A, B) operate to selectively engage with clutches (not shown) to rotate the main shaft 20 at variable speeds and indirectly rotate the output shaft 22. The available packaging space in the main housing 12 of the transmission 10 is dominated by the drum housings (16 and 18) for the electric motors A and B, respectively (as shown in FIG. 1). One technical advantage of the present invention is that it enables the main housing 12 to accommodate both electric motors (A and B) by rearranging the position of other transmission components, namely the park pawl system 28. Located between and encircled by the pair of motors is a shift selector 24 that is connected (either mechanically or electrically) to the transmission gear shifter (not shown) and to a mechanical link (or connecting rod 26) that controls the park pawl system 28. The park pawl system 28 is encased by the end cover portion 14 of the transmission housing and functions to selectively interact with an engagement gear 30, which is secured to rotate with the output shaft 22. The end cover portion 14 defines a cavity 31, which provides sufficient access to the park pawl system 28 and its components for assembly and servicing without detaching the end cover portion 14 from the main housing 12.

FIG. 2 details the interaction between the engagement gear 30, park pawl system 28 and the shift selector 24. The engagement gear 30 has a number of teeth 32 and tooth recesses 34 on its perimeter. On the inner diameter of the engagement gear 30 are a series of complementary splines 36 functioning to secure the engagement gear 30 directly onto the clutch housing 72 (as shown in FIG. 3) and indirectly onto the output shaft 22 (shown in FIG. 1). When the wheels of the vehicle rotate by external forces, such as gravity, the drive shaft also turns and causes the output shaft 22 and engagement gear 30 on the clutch housing 72 to rotate as the engagement gear 30 is configured to rotate with the output shaft 22.

With reference to FIG. 2, the park pawl system 28 consists of a pawl pin 38, torsion spring (or pawl return spring 40), pawl 42 and actuator guide 46. The pawl 42, actuator 48, and actuator guide 46 are placed in the end cover portion 14, situated to axially align the pawl 42 with the pawl engagement gear 30. The pawl 42 is configured to fit in the tooth recesses 34 on the engagement gear 30 perimeter upon activation of the park pawl system 28 (as shown at 35). The pawl 42 is mounted on the pawl pin 38, and is free to rotate or pivot about the pawl pin 38. A pawl return spring 40 operates to hold the pawl 42 in the disengaged position except when mechanically engaged. The pawl 42 is mounted adjacent to a slotted actuator guide 46 and actuator 48 so that upon transverse motion of the actuator 48 the pawl 42 is rotated or pivoted between the engaged and disengaged positions.

The actuator guide 46 encases the actuator 48 and is secured by a pin 76 (through aperture 77 shown in FIG. 3) with respect to the end cover portion 14. The end cover portion 14 is hollowed at pocket 75 to receive and accommodate the end shape of the actuator guide 46. The actuator guide 46 has an inner cavity 54 contoured to the shape of the actuator 48 (as shown in FIG. 2). The actuator guide 46 has a slot 50 on its perimeter, adjacent the back 43 of the pawl 42, which is configured to guide and support the pivotal movement of the pawl 42. Movement of the actuator 48 aft causes the cam portion 49 and wide portion 52 of the actuator to collide with the back 43 of the pawl and force the park pawl 42 to rotate or pivot into engagement with a recess 34 in the engagement gear 30. Movement of the actuator 48 forward with respect to the pawl 42 moves the cam portion 49 away from the back 43 of the pawl 42 to remove the force of the cam, whereby to release the pawl 42 from the tooth recess 34. When the pawl 42 is released from the tooth recesses 34, the pawl return spring 40 rotates the pawl 42 into the disengaged position allowing the engagement gear 30 to freely rotate.

The actuator 48 is spring mounted to an end portion 27 of the connecting rod 26. The axially positioned linear spring (or actuator return spring 58) functions to enable shift selection of park regardless of the position of pawl 42 relative to the engagement gear 30, teeth 32 and tooth recesses 34. If an engagement gear tooth 32 is located over or adjacent to the pawl 42 when park is selected, the pawl will not engage in a recess 34, but the end 27 of the connecting rod will continue to move with respect to the actuator 48 against the bias of spring 58, and the end 27 of the connecting rod will extend slightly beyond the end 55 of the actuator. The actuator return spring 58 enables selection of park by maintaining an axial force or bias on the actuator 48 until the engagement gear 30 rotates to a point where the gear tooth 32 is no longer adjacent to the pawl 42. With the continued bias of actuator return spring 58, the pawl 42 will then engage with a tooth recess 34 at the first opportunity (usually when the vehicle starts or continues to roll). The end 27 of the connecting rod 26, which functions as a mechanical link between the shift selector 24 and the actuator 48 then moves again with respect to the actuator 48 as the pawl 42 engages the tooth recess 34.

With reference to FIGS. 1 and 2, the connecting rod 26 is secured to the detent lever 60 of the shift selector at 61. The detent lever 60 is pivotably secured with respect to the main housing 12 of the transmission at 62, where the selector shaft lever (not shown) is also connected. The perimeter of the detent lever 60 has detents 64 on its lower end. The detents 64 are configured to engage with the cylindrical end 66 of a detent retention spring 68. The detent retention spring 68 is indirectly mounted with respect to the main housing 12 of the transmission so that upon placing the vehicle in park the selector shaft lever rotates the detent lever 60 and the cylindrical end 66 of the detent retention spring 68 engages with the most aft detent 70 of the detent lever 60 to secure it in place. To reach this position the detent lever 60 rotates clockwise, or rearward with respect to the main housing 12 moving the connecting rod 26 rearward or toward the end cover portion 14 of the transmission housing 10.

Though this is the configuration of the park pawl system 28 in the preferred embodiment, the invention is also compatible with a variety of park systems such as the one described in U.S. Pat. No. 5,685,406 entitled "Park Brake Actuating Mechanism For A Power Transmission," Crum, et al., Nov. 11, 1997, assigned to General Motors Corporation and hereby incorporated by reference in its entirety.

The end cover portion 14 of the transmission housing, as shown in FIG. 3, is designed to encase the engagement gear 30 and park pawl system (38, 40, 42, 46 and 50). The end cover portion 14 is hollowed large enough at 31 to encase the engagement gear 30 and allow it to freely rotate. Splined to the engagement gear 30 is a clutch housing 72, which is also drivably connected to the output shaft 22 (only shown in FIG. 1) of the transmission. The end cover portion 14 contains an aperture 15 to allow for the output shaft 22 to extend out of the end cover portion 14 of the transmission housing. The end cover portion 14, as shown in FIG. 3, defines a cylindrical cavity 31 configured at one side to encircle and support the actuator guide 46 respectively at a pocket 75 and a formed cavity portion 74. The actuator guide 46 is secured to the end cover portion 14 by a pin 76 that runs through the end cover portion 14 at 78 and actuator guide 46 at 77. The end cover portion 14 allows for the connecting rod 26 of the shift selector 24 (both shown in FIG. 2) to pass from the main housing 12 of the transmission to the actuator 48 in the actuator guide 46 in the end cover 14 without interference. In addition to housing the park pawl system 28 and its components, the end cover portion 14 also defines several orifices (80, 82), which provide access to the park pawl system from the outside of the transmission. The first orifice 80 defines an access opening for assembly and service of the park pawl system 28. Orifice 82 provides an entry point for the pawl pin 38 to be assembled to the pawl 42 on the end cover portion 14. The end cover portion 14 further contains a compression gasket 84 to seal the end cover portion 14 as well as a detachable access cover 86 to close the end cover portion 14 of the transmission. The compression gasket 84 and access cover 86 are attached to the end cover portion 14 by a series of structural connectors (or bolts) 88. The end cover portion 14 is attachable to the main housing 12 by similar structural connectors such as 88 at mating orifices such as 90.

In sum, the connecting rod 26 between the shift selector 24 and the park pawl engagement system 28 passes through cast openings 94 in the transmission housing 12 and rear cover 14. The connecting rod 26, actuator 48, and actuator return spring 58 are assembled with the transmission main housing 12. The pawl engagement gear 30, pawl 42, pawl return spring 40, and actuator guide 46 are assembled with the transmission rear cover 14. The actuator 48, actuator return spring 58, and connecting rod 26 are passed thru the transmission main housing 12 and rear cover cast windows or configurations 74, and funneled into the actuator guide 46 during final assembly of the transmission 10.

The end cover portion 14 also provides structural support to the main housing 12 of the transmission 10 (shown in FIG. 1). The main housing 12 and end portion 14 see torsional loading from the repetitive revolutions of the electric motors (A and B), engine (not shown), clutches (not shown), and output shaft 22. The end cover portion 14 is configured to withstand the torsional loads, driveline loads, clutch piston loads, and park pawl loads of a 7800 lb. vehicle. To provide this support the end cover portion 14 is designed to be a uniform structure, as better seen in FIG. 3, and comprised of an enhanced aluminum alloy die casting Grade ANSI A380.0 or Grade ANSI 383.0. The uniform structure of the end cover portion 14 and use of this alloy provides the necessary structural support while also reducing the weight and material costs of the transmission.

In addition to structural support and reinforcements, the end cover portion 14 is designed to comply with packaging constraints and simplify assembly requirements. Primarily, the assembled transmission housing 10 must be compact enough on the inside to contain the park pawl system 28 without impinging upon neighboring vehicle components 98 while still providing the necessary underbody clearance for the vehicle. Additionally, various components located in the main housing 12 of the transmission 10 are accessible from both or either ends 94 or 96 of the main housing 12. Namely, electric motor B, as shown in FIG. 1, should fit through the opening or orifice between the main housing 12 and the end cover portion 14 at 94 before the end cover portion 14 of the transmission is attached to the main housing 12; and electric motor A, as shown in FIG. 1, should fit through the orifice or opening of the main housing 12 at 96. The main housing 12 and end cover portion 14 may be designed to provide various other points of entry into the transmission to simplify the assembly of the components located in the main housing 12, including a main housing 12 which can be accessed through either side of the main housing.

Though the end cover portion 14 may be manufactured through a number of processes, in the preferred embodiment the end cover portion 14 is manufactured by die-casting. Generally die-casting is compatible with the use of aluminum alloys. Additionally, die-casting generally also provides excellent dimensional accuracy and stability involving high volumes. The end cover portion 14 has a complex geometry, as shown in FIG. 3, wherein die-casting configures contours to facilitate the park pawl system 28 and its complimentary components—shown in FIG. 2—while remaining compact enough to meet the aforementioned compact packaging requirements. The die (not shown) for the end cover portion 14 is designed with configurations to provide such contoured surfaces.

While the best modes for carrying out the invention have been described in detail, those familiar with the art to which this invention relates will recognize various alternative designs and embodiments for practicing the invention within the scope of the appended claims.

The invention claimed is:

1. A transmission including a transmission housing, comprising:
   a main housing portion of the transmission housing;
   an actuable park pawl system;
   an end cover portion of the transmission housing; wherein said park pawl system is at least partially located in said end cover portion of the transmission housing; and
   an output shaft;
   wherein said end cover portion of said transmission housing is mechanically sufficiently strong to support loading from said output shaft of said transmission when said park pawl system is actuated;
   wherein said park pawl system includes a pawl, a pawl return spring, and actuator guide assembled with said end cover portion;
   wherein said end cover portion of the transmission housing is detachable from said main housing; and
   wherein said end cover portion of the transmission housing is configured to define a sufficient cavity therein to allow access to said park pawl system without detachment of said end cover portion of the transmission housing from said main housing.

2. A transmission including a transmission housing, comprising:
   a main housing portion of the transmission housing;
   an actuable park pawl system;
   an end cover portion of the transmission housing wherein said park pawl system is at least partially located in said end cover portion of the transmission housing
   a pawl engagement gear engageable with said actuable park pawl system; and
   an output shaft;
   wherein said end cover portion of said transmission housing is mechanically sufficiently strong to support loading from said output shaft of said transmission when said park pawl system is actuated;
   wherein said park pawl system includes a pawl, a pawl return spring, and actuator guide assembled with said end cover portion;
   wherein the transmission further comprises within said main housing portion of the transmission housing:
      a shift selector which is operative to actuate said park pawl system;
      a connecting rod operative to send a mechanical signal from said shift selector to said park pawl system; wherein said connecting rod is located at least partially in said main housing portion and at least partially in said end cover portion of the transmission housing; and
   wherein said end cover portion of the transmission housing is further configured to define an aperture through which said connecting rod may pass from said main housing portion to said actuator guide assembled with said end cover portion of the transmission housing.

3. The transmission of claim 2, wherein said end cover portion of the transmission housing is detachable from said main housing and including:
   a pawl pin for said pawl in said end cover portion of the transmission housing; and
   wherein said end cover portion of said transmission housing has an aperture configured to enable the installation of said pawl pin when said end cover portion of the transmission housing is attached to said main housing.

4. The transmission of claim 2, wherein said end cover portion of the transmission housing is die cast.

5. The transmission of claim 4, wherein said end cover portion of the transmission housing is comprised of an aluminum alloy, which in addition to being sufficiently strong, is significantly lighter in weight than a ferrous alloy.

6. The transmission of claim 5, wherein said end cover portion of the transmission housing is sufficiently compact to define a space adjacent the exterior of the transmission housing to enable other vehicle components to nest adjacent the exterior of the transmission housing.

7. The transmission of claim 2, wherein said end cover portion of the transmission housing is detachable from said main housing and
wherein said park pawl system in said end cover portion of the transmission housing includes:
said pawl engagement gear;
wherein said park pawl system is operative to resist a vehicle's tendency to roll down a sloped surface through engagement of said pawl with said pawl engagement gear;
an output shaft fixed with respect to said pawi engagement gear and rotatable therewith in the transmission housing;
a first electric motor located in said main housing portion and operative to selectively turn said output shaft;
a second electric motor located in said main housing portion and operative to selectively turn said output shaft; and
wherein said end cover portion of the transmission housing is configured sufficiently large to allow at least said second electric motor to be assembled into said main housing portion when said end cover portion is detached from said main housing portion.

8. A transmission, comprising:
a main housing portion which at least partially encases the contents of the transmission;
a pawl engagement gear;
an output shaft fixed with respect to said pawl engagement gear and rotatable therewith;
a first electric motor located in said main housing portion and operative to selectively turn said output shaft;
a second electric motor located in said main housing portion and also operative to selectively turn said output shaft;
an end cover portion attachable to said main housing portion and configured sufficiently large to allow at least said second electric motor to be assembled into said main housing portion;
a park pawl system engageable with said pawl engagement gear and at least partially located in said end cover portion of the transmission;
wherein said park pawl system includes a pawl, actuator, and actuator guide; and
wherein said end cover portion of the transmission is configured to define a sufficient cavity therein to allow access to said park pawl system without detachment of said end cover portion from said main housing.

9. A transmission having a transmission housing, including a main housing portion and an end cover portion, comprising:
a pawl engagement gear in one of said housing portions;
a park pawi system in said end cover portion engageable with said pawl engagement gear;
an output shaft rotatable with said pawl engagement gear;
a first electric motor located in said main housing portion and operative to selectively rotate said output shaft;
a second electric motor located in said main housing portion and operative to selectively rotate said output shaft;
a shift selector in said main housing portion; and
wherein said park pawl system in said end cover portion is linked to said shift selector in said main housing portion.

10. The transmission of claim 9, wherein said shift selector is a mechanical unit; operative to actuate said park pawl system; and
wherein said mechanical unit includes a connecting rod operative to send a mechanical signal from said shift selector to said park pawl system; wherein said connecting rod passes at least partially through said main housing portion to said end cover portion of the transmission housing.

11. A method of assembling a hybrid electro-mechanical vehicular transmission having an electric motor module and a park pawl engagement system comprising:
providing a transmission main housing with a terminal portion sufficiently open-ended to receive and house said electric motor module and a first portion of said park pawl engagement system;
providing a transmission end cover sufficiently expansive for covering the open-end of said terminal portion and sufficiently configured to house a second portion of said park pawl engagement system and configured to define a sufficient cavity therein to allow access to said park pawi system without detachment of said end cover portion from said main housing;
assembling said first portion of said park pawl engagement system in said transmission main housing;
assembling said second portion of said park pawl engagement system in said transmission end cover; and
mechanically inter-connecting said first and second portions of said park pawl engagement system during the covering of the open-end of said terminal portion by said transmission end cover.

12. The method of claim 11, wherein said first portion of said park pawl engagement system includes a connecting rod, an actuator, and an actuator return spring; and
wherein said connecting rod mechanically interconnects said first and second portions of said park pawl engagement system.

13. The method of claim 12, wherein said second portion of said park pawl engagement system includes a pawl engagement gear, a pawl, a pawl return spring, and an actuator guide; and wherein said actuator and said actuator spring are assembled on said connecting rod and said actuator is funneled into said actuator guide during the covering of the open-end of said terminal portion of said main housing by said transmission end cover.

14. The method of claim 11, wherein said first mentioned electric motor module is assembled in said terminal portion adjacent to the open-end thereof; and wherein said first portion of said park pawl system further includes a shift selector housed in said transmission main housing on the opposite side of said electric motor module from the open-end of said terminal portion of said main housing; and wherein said shift selector is assembled to provide mechanical input to the mechanical inter-connection of said first and second portions of said park pawl engagement system.

15. The method of claim 14, wherein the main housing portion of the hybrid electro-mechanical vehicular transmission is provided to receive and house a second electric motor module which is assembled therein; and wherein said shift selector is placed between the first and second electric motor modules in the main housing portion.

\* \* \* \* \*